(12) United States Patent
Chan et al.

(10) Patent No.: US 12,471,539 B2
(45) Date of Patent: Nov. 18, 2025

(54) HAND TOOL WITH SHEAR ASSEMBLY

(71) Applicant: TECHTRONIC CORDLESS GP, Anderson, SC (US)

(72) Inventors: Rony Chan, Simpsonville, SC (US); Samuel Nelson, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 136 days.

(21) Appl. No.: 17/723,836

(22) Filed: Apr. 19, 2022

(65) Prior Publication Data

US 2022/0346326 A1 Nov. 3, 2022

Related U.S. Application Data

(60) Provisional application No. 63/181,575, filed on Apr. 29, 2021.

(51) Int. Cl.
*A01G 3/025* (2006.01)
*A01G 3/02* (2006.01)
*A01G 3/047* (2006.01)

(52) U.S. Cl.
CPC .......... *A01G 3/0251* (2013.01); *A01G 3/021* (2013.01); *A01G 3/0475* (2013.01)

(58) Field of Classification Search
CPC ........ A01G 3/0251; A01G 3/021; A01G 3/02; A01G 3/0478; A01G 3/025; A01G 3/0475; B26B 13/26; B26B 17/02
USPC ............................ 30/190, 249, 250, 251, 252
See application file for complete search history.

(56) References Cited

U.S. PATENT DOCUMENTS

| | | | | |
|---|---|---|---|---|
| 1,577,140 A | * | 3/1926 | Newton | A01K 17/00 30/250 |
| 5,159,757 A | * | 11/1992 | Weid | A01G 3/0251 30/249 |
| 5,511,314 A | * | 4/1996 | Huang | A01G 3/0251 30/249 |

(Continued)

FOREIGN PATENT DOCUMENTS

| | | |
|---|---|---|
| CN | 201450911 U | 5/2010 |
| CN | 202406603 U | 9/2012 |

(Continued)

OTHER PUBLICATIONS

EP-3476205-A1 English Translation; May 1, 2019; Held, Peter.*
Canadian Office Action corresponding with Application No. 3,156,915 on Jul. 20, 2023 (1 page).

*Primary Examiner* — Laura M Lee
(74) *Attorney, Agent, or Firm* — Dority & Manning, P.A.

(57) ABSTRACT

A hand tool includes a first handle forming a channel, and a second handle including a cutting member. A linkage is attached in pivotal arrangement to the first handle at the channel and to a cutting blade. The cutting blade is attached in pivotal arrangement to the second handle. The first handle is pivotally attached to the second handle via a fastener. The first handle includes a first portion, and a second portion includes a handle grip. The first portion extends substantially along a first reference axis, and the second portion extends substantially along a second reference axis. The first reference axis and the second reference axis extend at an acute angle relative to one another. The channel extends substantially along the first reference axis at the first portion.

16 Claims, 12 Drawing Sheets

(56) References Cited

U.S. PATENT DOCUMENTS

| | | |
|---|---|---|
| 5,634,276 A | 6/1997 | Lin |
| 5,761,815 A * | 6/1998 | Lin .................... A01G 3/0251 30/140 |
| D401,485 S | 11/1998 | Liao |
| D446,095 S | 8/2001 | Lai |
| D464,854 S | 10/2002 | Lai |
| 6,829,828 B1 | 12/2004 | Cech et al. |
| D500,942 S | 1/2005 | Lai |
| D510,002 S | 9/2005 | Lai |
| D650,249 S | 12/2011 | Lee |
| 8,166,659 B2 | 5/2012 | Huang |
| 8,458,912 B2 | 6/2013 | Lindén et al. |
| D691,005 S | 10/2013 | Wu |
| D693,659 S | 11/2013 | Liu |
| D702,516 S | 4/2014 | Liu |
| D703,498 S | 4/2014 | Atnip et al. |
| 8,732,960 B2 | 5/2014 | Wang |
| D712,230 S | 9/2014 | Atnip et al. |
| D726,523 S | 4/2015 | Atnip et al. |
| 9,066,473 B2 | 6/2015 | Podlesny |
| 9,282,697 B2 | 3/2016 | Wu |
| 9,296,116 B2 | 3/2016 | Descombes et al. |
| 9,345,200 B2 | 5/2016 | Cunningham |
| 9,591,808 B2 | 3/2017 | Lin |
| 9,622,422 B2 * | 4/2017 | Hsu .................... B26B 13/26 |
| 9,736,990 B2 | 8/2017 | Lin |
| D802,384 S | 11/2017 | Wolf et al. |
| 10,212,891 B1 | 2/2019 | Wu |
| D859,101 S | 9/2019 | Wu |
| 12,310,300 B2 * | 5/2025 | Chan .................... A01G 3/0251 |
| 2016/0345505 A1 * | 12/2016 | Hsu .................... A01G 3/021 |
| 2017/0157747 A1 | 6/2017 | Wang |

FOREIGN PATENT DOCUMENTS

| | | | |
|---|---|---|---|
| CN | 202524796 U | 11/2012 | |
| CN | 302358753 S | 3/2013 | |
| CN | 302358756 S | 3/2013 | |
| CN | 302369835 S | 3/2013 | |
| CN | 302379958 S | 4/2013 | |
| CN | 302870945 S | 7/2014 | |
| CN | 304852104 S | 10/2014 | |
| CN | 205357250 U | 7/2016 | |
| CN | 206078203 U | 4/2017 | |
| CN | 207940052 U | 10/2018 | |
| CN | 105458955 B | 5/2019 | |
| CN | 106031346 B | 5/2019 | |
| CN | 209251150 U | 8/2019 | |
| CN | 209643407 U | 11/2019 | |
| CN | 305496643 S | 12/2019 | |
| CN | 305865730 S | 6/2020 | |
| CN | 305883880 S | 6/2020 | |
| DE | 19712170 A1 * | 11/1997 | ........... A01G 3/0251 |
| DE | 102011018464 A1 | 11/2011 | |
| DE | 202014100816 U1 | 5/2014 | |
| DE | 112014006266 T5 | 10/2016 | |
| DE | 202018101754 U1 | 4/2018 | |
| EP | 0074578 B1 | 12/1984 | |
| EP | 1219165 A2 | 7/2002 | |
| EP | 1827770 A1 | 9/2007 | |
| EP | 3476205 | 5/2019 | |
| EP | 3476205 A1 * | 5/2019 | ........... A01G 3/0251 |
| EP | 3476205 B1 | 12/2020 | |
| FR | 014967-001 S | 10/2001 | |
| FR | 2825573 A3 | 12/2002 | |
| GB | 2358338 A | 7/2001 | |
| GB | 2444912 A | 6/2008 | |
| GB | 2478176 A | 8/2011 | |
| WO | WO2010101666 A1 | 9/2010 | |

* cited by examiner

HAND TOOL WITH SHEAR ASSEMBLY

PRIORITY STATEMENT

The present application claims the benefit of priority to U.S. Provisional Patent Application Ser. No. 63/181,575, filed on Apr. 29, 2021, the disclosure of which is incorporated by reference herein in its entirety.

FIELD

The present subject matter is directed generally to hand tools. Particular aspects of the present disclosure are directed to hand tools with shear assemblies, such as outdoor shears, cutters, and loppers.

BACKGROUND

Hand tools, such as outdoor shears, garden shears, hedge shears, or loppers, are configured to cut members by a force exerted by a user at a pair of handles. Members, such as branches, hedges, bushes, etc., may be of various thicknesses, densities, or strengths, which may correspondingly require different amounts of force to be exerted by the user through the handles. Limited movement of the handles may limit an amount of force that may be exerted by the hand tool to cut such various members. Additionally, hand tools may require repeated motions to quickly cut through multiple members. For instance, a user may require a hand tool to quickly cut through thinner, lighter members, such as hedges and bushes. In another instance, a user may require a hand tool to apply relatively large amounts of shear force to cut through relatively thicker, denser, or stronger members, such as branches. Shear assemblies for hand tools may generally perform one type of usage or the other.

Accordingly, improved shear designs are desired in the art. In particular, improved shear designs which can move between compound and speed action would be advantageous. Still particularly, improved shear designs which can move between compound and speed action for a single hand tool would be advantageous.

BRIEF DESCRIPTION

Aspects and advantages of the invention will be set forth in part in the following description, or may be obvious from the description, or may be learned through practice of the invention.

An aspect of the present disclosure is directed to a hand tool including a shear assembly. The hand tool includes a first handle, a second handle, a cutting blade, and a linkage. The first handle forms a channel extending along a reference axis corresponding to an extension of the first handle. The second handle includes a cutting member. The cutting blade forms a first opening and a second opening. The linkage is attached, via a first fastener, in pivotal arrangement to the first handle at the channel and to the cutting blade at the second opening. The cutting blade is attached, via a second fastener, in pivotal arrangement to the second handle at the first opening.

Another aspect of the present disclosure is directed to a method for operating a hand tool. The method includes coupling a linkage in a selectively sliding arrangement via a first fastener at a channel at a first handle; pivotally coupling a cutting blade to a second handle via a second fastener at a second handle-cutting blade interface; pivotally coupling a linkage to the cutting blade via a third fastener; sliding the first fastener to a first channel end at the channel, wherein sliding the first fastener to the first channel end configures the hand tool in a first operating mode; and sliding the first fastener to a second channel end at the channel distal to the first channel end, wherein sliding the first fastener to the second channel end configures the hand tool in a second operating mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved shear designs, and in particular improved shear designs which can move between compound and speed action.

As used herein, the terms "first", "second", and "third" may be used interchangeably to distinguish one component from another and are not intended to signify location or importance of the individual components.

Embodiments of a hand tool with a shearing, cutting, lopper, or other appropriate cutting tool, or gripping tool, or other compound gripping motion (e.g., pliers) are provided. Various embodiments of the hand tool provided herein are configured to selectively articulate between a speed action movement and a compound action movement, such as to allow for greater range or angle of motion between handles. Embodiments provided herein may allow a user to relatively simply and quickly change between operating modes, such as to facilitate greater application of force for cutting members in a first operating mode, and such as to facilitate quicker opening and closing action in a second operating mode. Still particular embodiments provided herein may allow a user to articulate between the first and second operating modes without necessitating removal, separation, or disconnection of components from the hand tool. Various embodiments provided herein may form a hedge shear, a garden shear, a lopper, a pruner tool, small cutters (e.g., hand-held by a single hand), pliers, or other appropriate hand tool.

Exemplary embodiments of a hand tool with a shear assembly are provided. Referring now to FIGS. 1-9, an exemplary embodiment of hand tool 150 include a shear assembly having a first handle 110 and a second handle 120. Second handle 120 includes a cutting member 112, such as a shaving block or shearing tool, configured to selectively engage a cutting blade 130. The cutting blade 130 is connected to the first handle 110. Cutting blade 130 includes a blade edge 132. Blade edge 132 is configured to selectively engage cutting member 112, such as to cut, shear, or lop a member placed between the blade edge 132 and the cutting member 112 (e.g., depicted in FIG. 2 and FIG. 7). In a particular embodiment, cutting blade 130 is affixed to the second handle 120 at fastener 147. Fastener 147 extends into second handle 120 and cutting blade 130, such as through an opening at a second handle-cutting blade interface, such as a first interface 157 (FIGS. 3-4), corresponding to second handle 120 and cutting blade 130. In various embodiments, fastener 147 extends fully through cutting blade 130 and at least partially through second handle 120. In particular embodiments, second handle 120 is configured to allow cutting blade 130 to pivot at fastener 147 extended through the opening at first interface 157.

Figure 3:
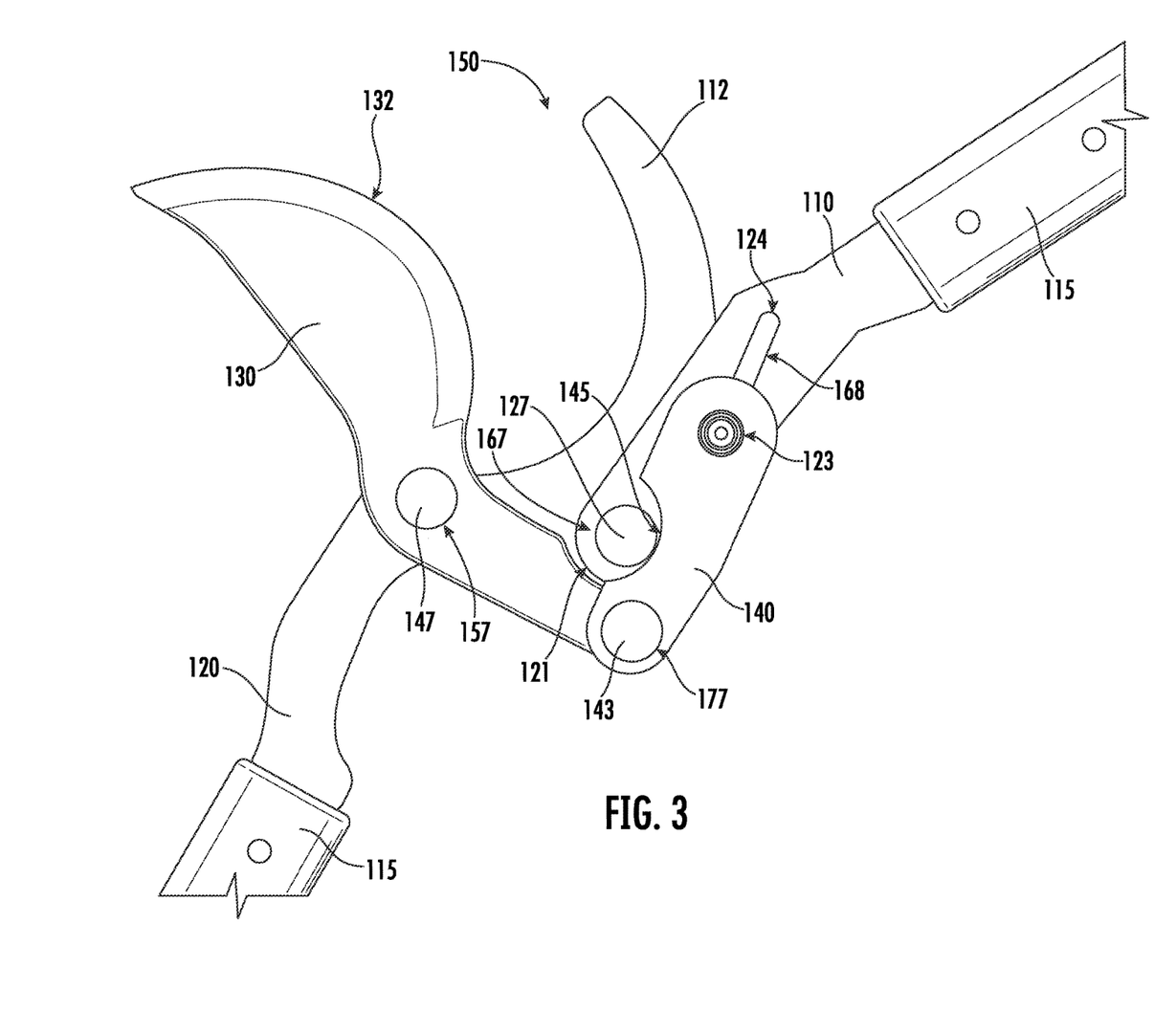
FIG. 3 depicts a detailed view of an exemplary embodiment of the first side of a hand tool in the open position in the first operating mode accordance with aspects of the present disclosure.
Figure 4:
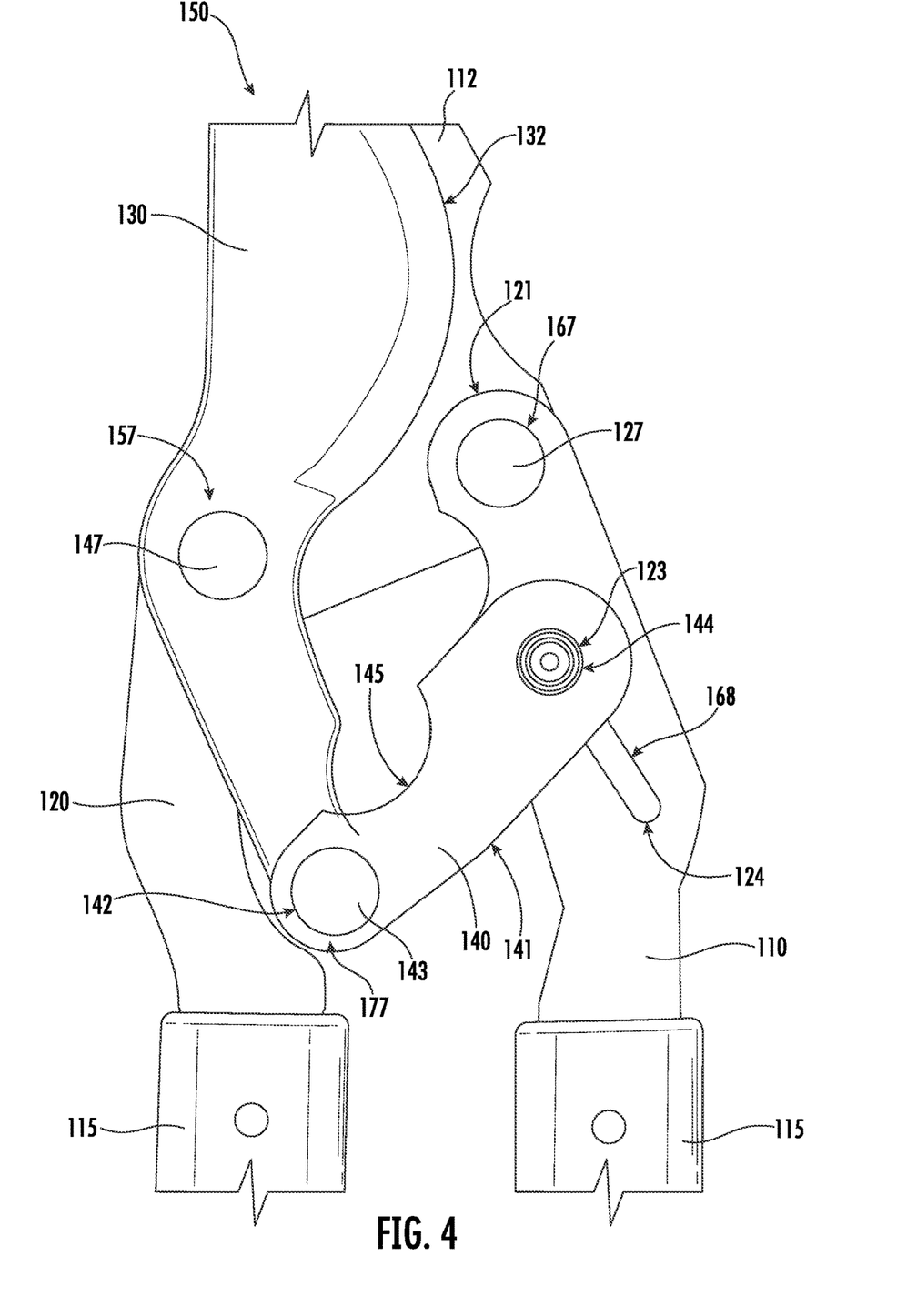
FIG. 4 depicts a detailed view of an exemplary embodiment of the hand tool in a closed position in the first operating mode in accordance with aspects of the present disclosure.

In a particular embodiment, first handle 110 is affixed to second handle 120 at fastener 127. Fastener 127 extends into first handle 110 and second handle 120 at a second interface 167 (FIGS. 3-4). Second interface 167 forms an opening into second handle 120 and first handle 110 into which fastener 127 is positioned. In various embodiments, fastener 127 extends fully through first handle 110 and at least partially through second handle 120. In particular embodiments, second handle 120 is configured to allow first handle 110 to pivot at fastener 127 extended through the opening at second interface 167.

First handle 110 forms a proximal end 121 (FIGS. 3-4) relative to second handle 120. First handle 110 forms an opening configured to receive fastener 127 at the proximal end 121. Accordingly, the opening is positioned at second interface 167 at which first handle 110 and second handle 120 are connected via fastener 127 at the proximal end 121 of second handle 120.

First handle 110 forms a channel 168 extending substantially along a reference axis 125 corresponding to an extension of at least a portion of first handle 110. In a particular embodiment, reference axis 125 extends from a center point of the opening configured to receive fastener 127. First handle 110 forms a channel 168 extending substantially along axis 125. Channel 168 is configured to receive fastener 123. In a still particular embodiment, channel 168 is extended from a first end proximate to proximal end 121 to a second end distal to the proximal end 121 relative to extension of the first handle 110. Channel 168 forms a first channel end 122 at the first end and a second channel end 124 at the second end. First channel end 122 is formed proximate to interface 167 relative to the second channel end 124. First handle 110 forms first channel end 122 separated along axis 125 from second channel end 124. As described further herein, fastener 123 is configured to slide and affix at the first channel end 122 to position the hand tool 150 in a first operating mode, and furthermore configured to slide and affix at the second channel end 124 to position the hand tool 150 in a second operating mode. Fastener 123 is further configured to allow for selective articulation or movement through channel 168.

In a particular embodiment, cutting blade 130 includes linkage 140 configured to attach cutting blade 130 to first handle 110. Cutting blade 130 is affixed to linkage 140 at fastener 143. Fastener 143 extends into linkage 140 and cutting blade 130 at a third interface 177 (FIGS. 3-4). Third interface 177 forms an opening into the cutting blade 130 and linkage 140 into which fastener 143 is positioned. In various embodiments, fastener 143 extends fully through linkage 140 and at least partially through cutting blade 130. In particular embodiments, linkage 140 is configured to allow cutting blade 130 to pivot at fastener 143 extended through the opening at third interface 177.

Referring to FIG. 4, linkage 140 includes a body 141 forming a first linkage opening 142 laterally separated from a second linkage opening 144 each extending through the body 141. Opening 142 is configured to correspond to interface 177 at which fastener 143 is extended into linkage 140 and cutting blade 130. Opening 144 is configured to correspond to channel 168 at which fastener 123 is extended into linkage 140 and first handle 110.

Referring to FIGS. 1-9, in certain embodiments, linkage 140 forms a notch or groove 145 into the body 141. In a particular embodiment, linkage 140 forms groove 145 to receive fastener 127. In a still particular embodiment, such as depicted in FIG. 3, groove 145 is configured to receive fastener 127 when the hand tool 150 is configured into the first operating mode and in the open position. Particularly, groove 145 is configured to receive fastener 127 when fastener 123 is positioned at the first channel end 122 and hand tool 150 is extended into the open position.

Figure 1:
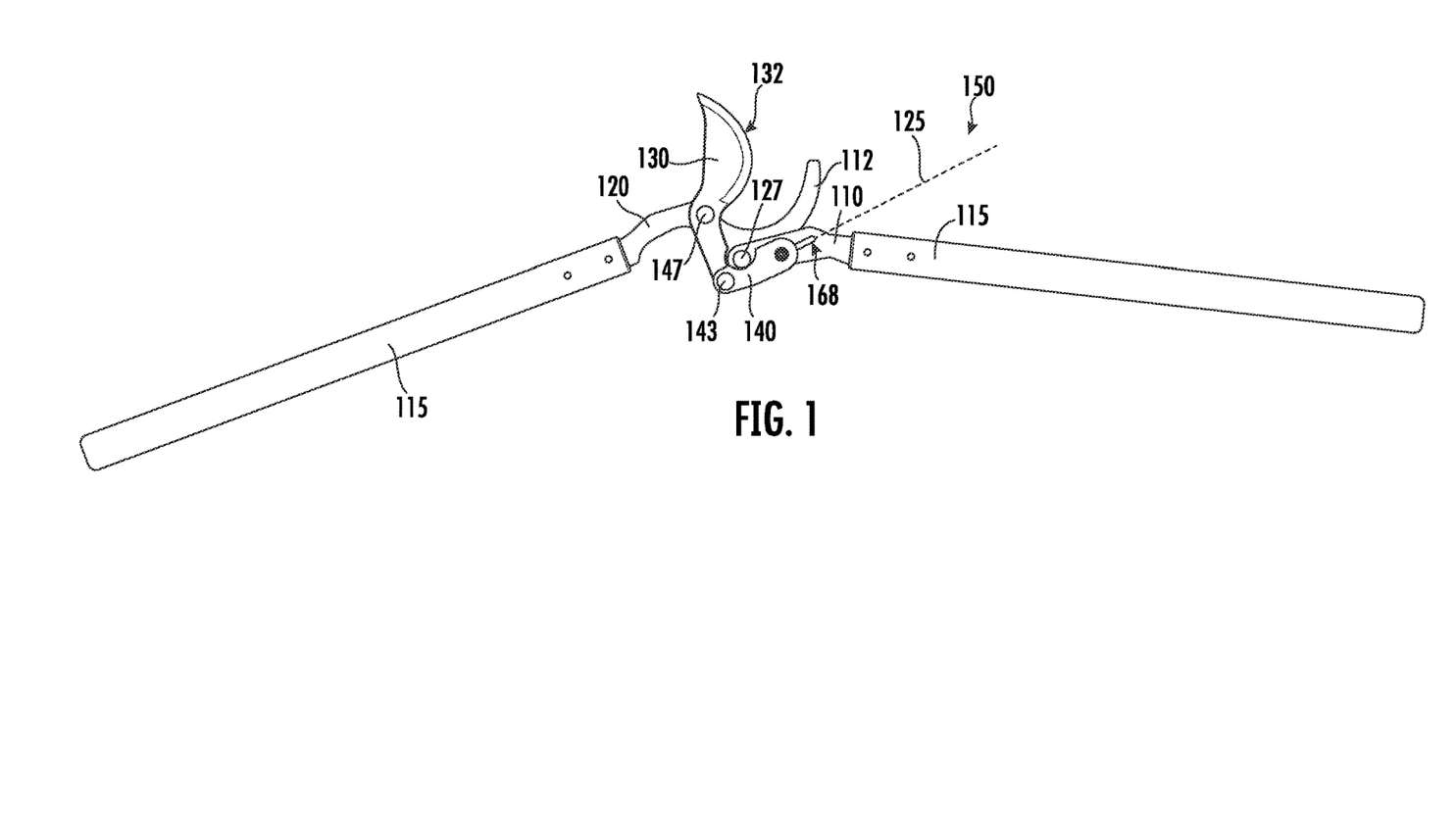
FIG. 1 depicts an exemplary embodiment of a first side of a hand tool in an open position in a first operating mode accordance with aspects of the present disclosure.
Figure 2:
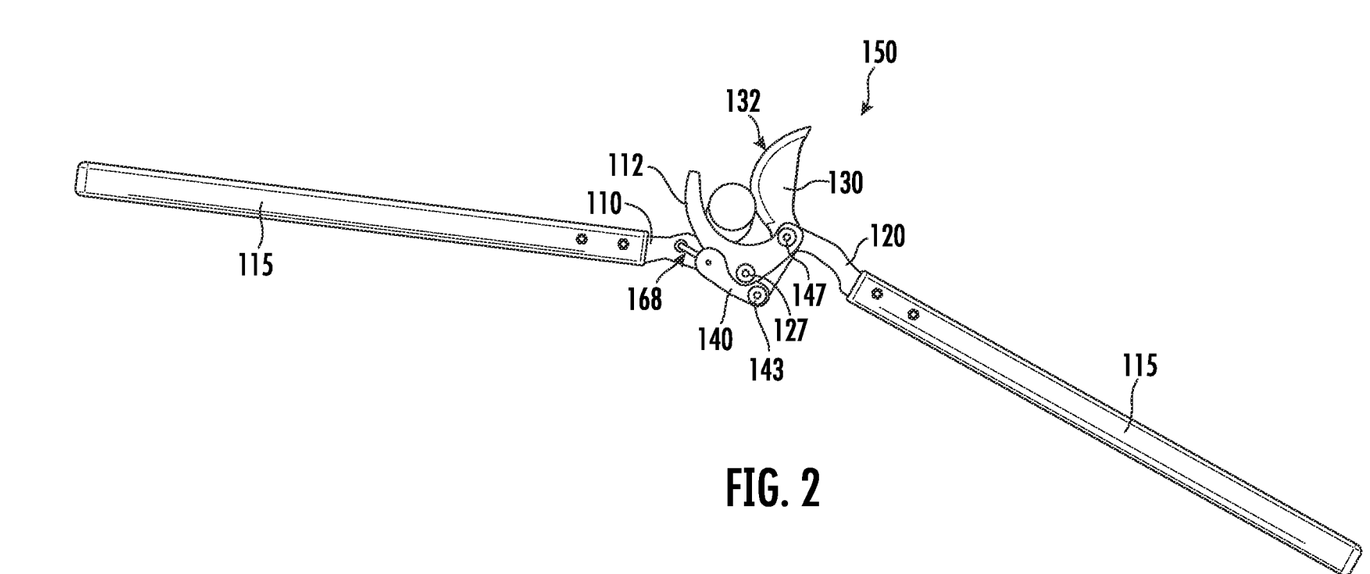
FIG. 2 depicts an exemplary embodiment of a second side of the hand tool of FIG. 1 in the open position in the first operating mode in accordance with aspects of the present disclosure.
Figure 6:
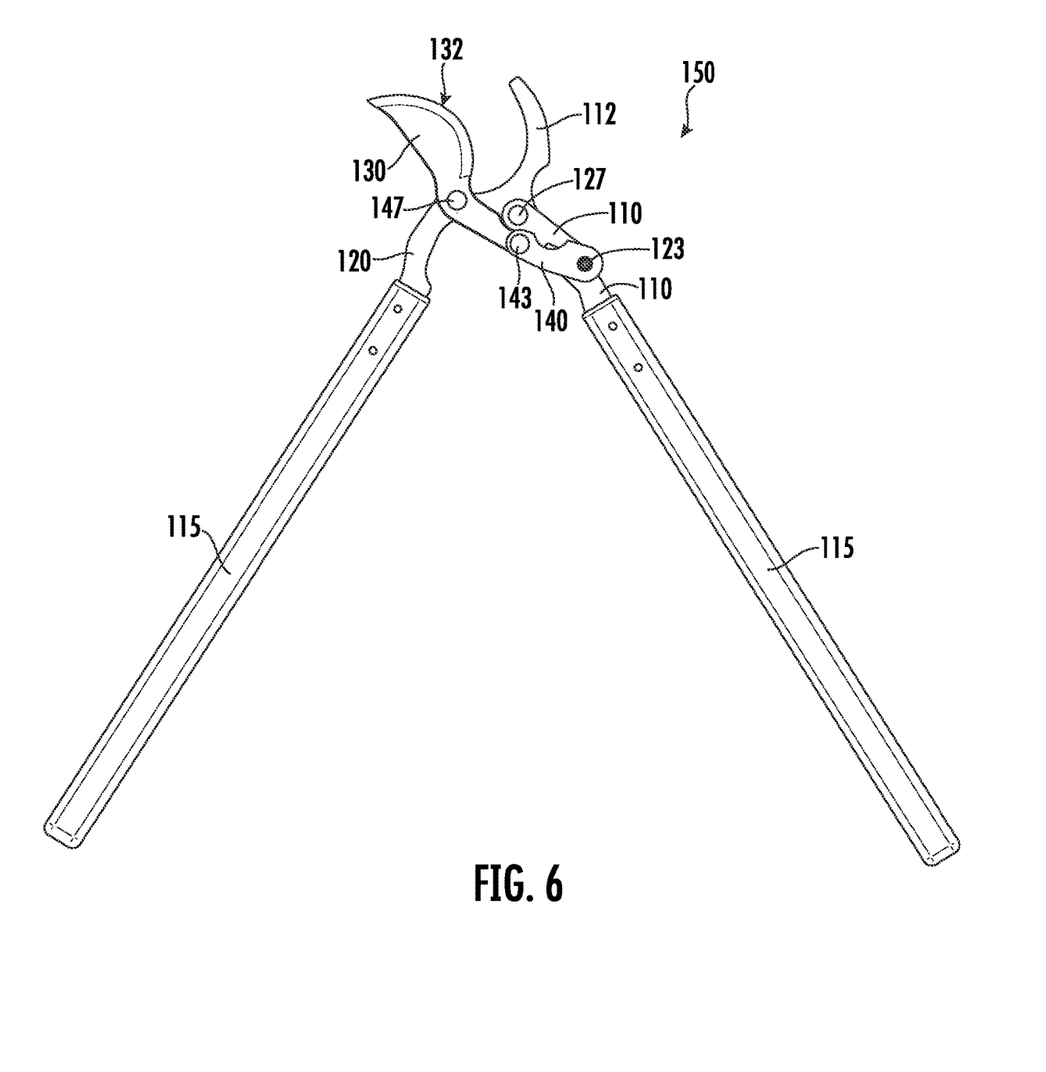
FIG. 6 depicts an exemplary embodiment of the first side of the hand tool in an open position in the second operating mode in accordance with aspects of the present disclosure.
Figure 7:
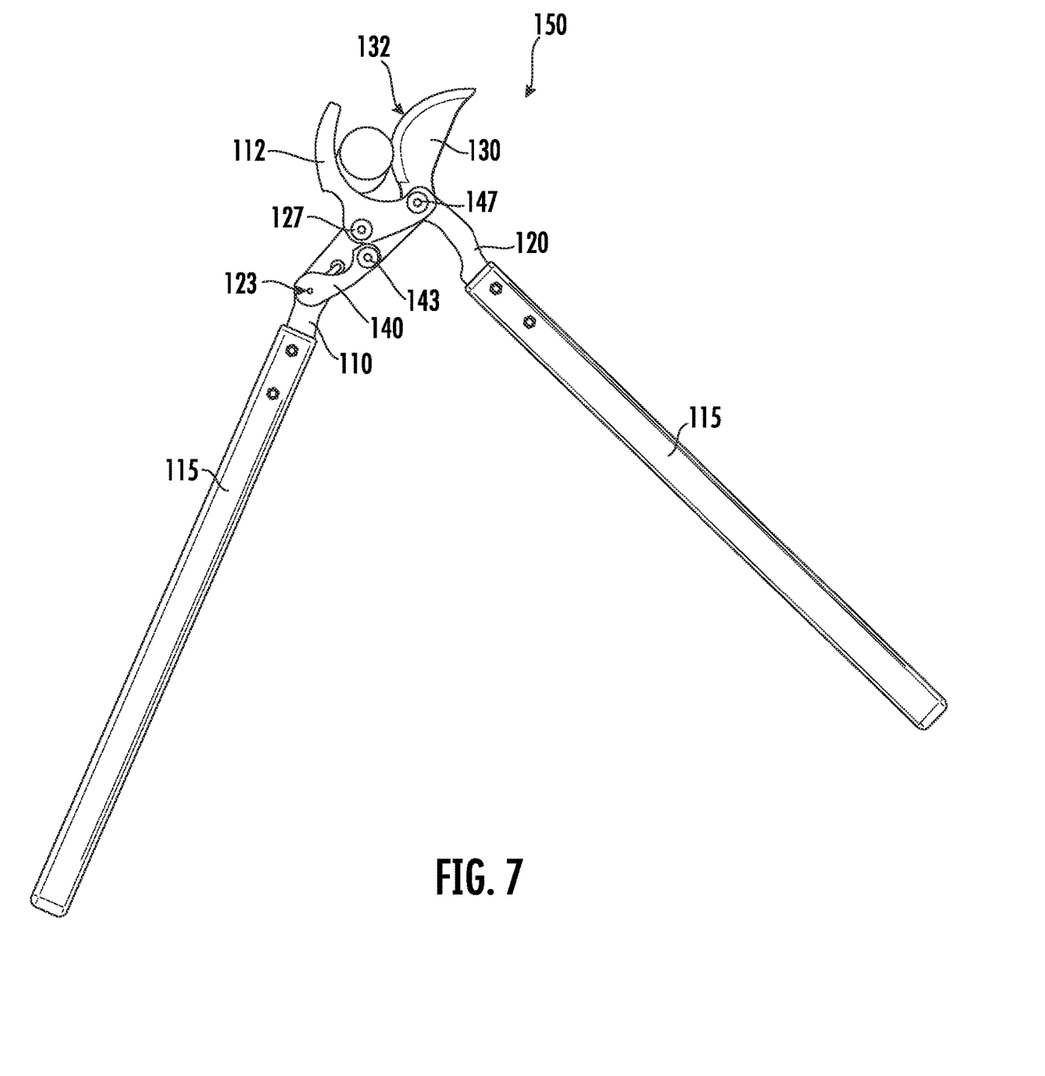
FIG. 7 depicts an exemplary embodiment of the second side of the hand tool in the open position in the second operating mode in accordance with aspects of the present disclosure.

Referring to FIGS. 1-2 and FIGS. 6-7, views of a first side (FIG. 1, FIG. 6) and a second side (FIG. 2, FIG. 7) are provided. FIGS. 1-2 depict the hand tool in an open position in the first operating mode, such as a compound action movement mode further described herein. FIGS. 6-7 depict the hand tool in an open position in the second operating mode, such as a normal or speed action mode further described herein. Linkage 140 may include a pair of portions positioned at the first side and the second side. Accordingly, fastener 123 may be configured to be received through the pair of linkages 140. Additionally, fastener 143 may be configured to be received through the pair of linkages 140.

In accordance with an exemplary embodiment, hand tool 150 includes a first operating mode, such as depicted in FIGS. 1-4. In the exemplary first operating mode, fastener 123 is extended through first channel end 122 at the first handle 110 and through second linkage opening 144 at linkage 140. Accordingly, first handle 110 is coupled via fastener 123 in the first operating mode to the cutting blade 130 at the first channel end 122 and the first handle 110 at the first channel end 122. FIG. 4 depicts hand tool 150 in an exemplary closed position and in the first operating mode. In the first operating mode, hand tool 150 allows first handle 110 to extend into open position (FIGS. 1-3) by pivoting relative to fastener 127 at second interface 167. Fastener 123 is extended into first channel end 122, allowing for compound action movement of second handle 120 relative to cutting blade 130 through linkage 140. Cutting blade 130 pivots via fastener 147 at first interface 157. First operating mode allows first handle 110 to extend in open position, such as extended from closed position (FIG. 4) to open position (FIGS. 1-3) at an angle. In various embodiments, first handle 110 may extend at angle up to approximately 92 degrees between the closed position to the open position. In such an embodiment, first operating mode may form a compound mode or compound action movement of the hand tool 150 from the closed position (FIG. 4) to the open position (FIGS. 1-3).

Figure 5:
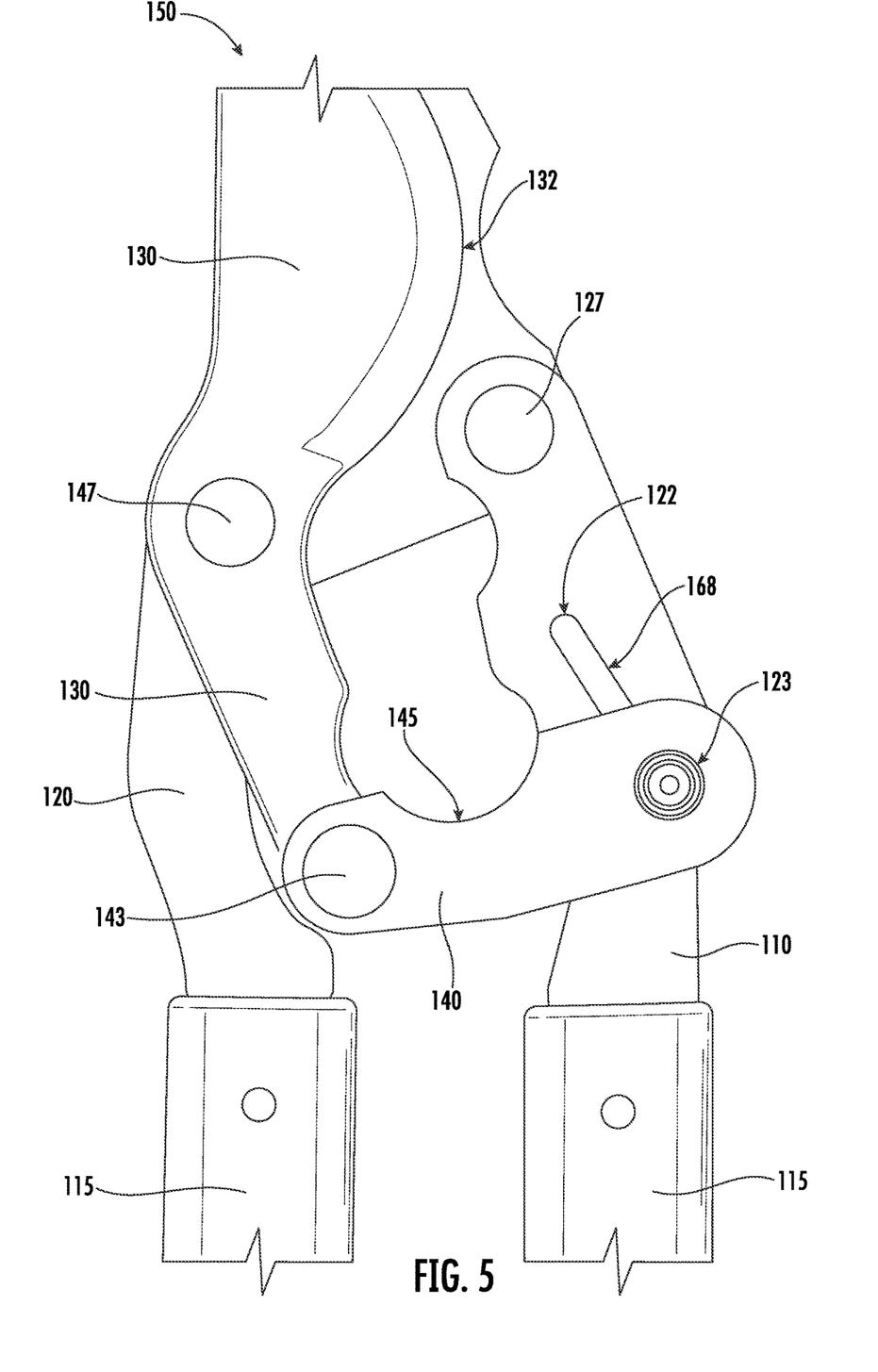
FIG. 5 depicts a detailed view of an exemplary embodiment of the hand tool in a closed position in a second operating mode in accordance with aspects of the present disclosure.

In accordance with an exemplary embodiment, hand tool 150 includes a second operating mode, such as depicted in FIGS. 5-9. In the exemplary second operating mode, fastener 123 is extended through second channel end 124 at the first handle 110 and through second linkage opening 144 at linkage 140. Accordingly, first handle 110 is coupled via fastener 123 in the second operating mode to the cutting blade 130 at the second channel end 124 and the first handle 110 at the second channel end 124. FIG. 5 depicts hand tool 150 in an exemplary closed position and second operating mode. In the second operating mode, hand tool 150 allows first handle 110 to extend into open position (FIGS. 6-9) by pivoting relative to fastener 127 at second interface 167. Fastener 123 is extended into second channel end 124 and second linkage opening 144, allowing for movement of first handle 110 relative to cutting blade 130 through linkage 140. Cutting blade 130 pivots via fastener 147 at first interface 157. Second operating mode allows first handle 110 to extend in open position, such as extended from closed position (FIG. 5) to open position (FIGS. 6-9), at an angle. In various embodiments, first handle 110 may extend at an angle up to approximately 49 degrees from the closed position (FIG. 5) to the open position (FIGS. 6-9).

Figure 12:
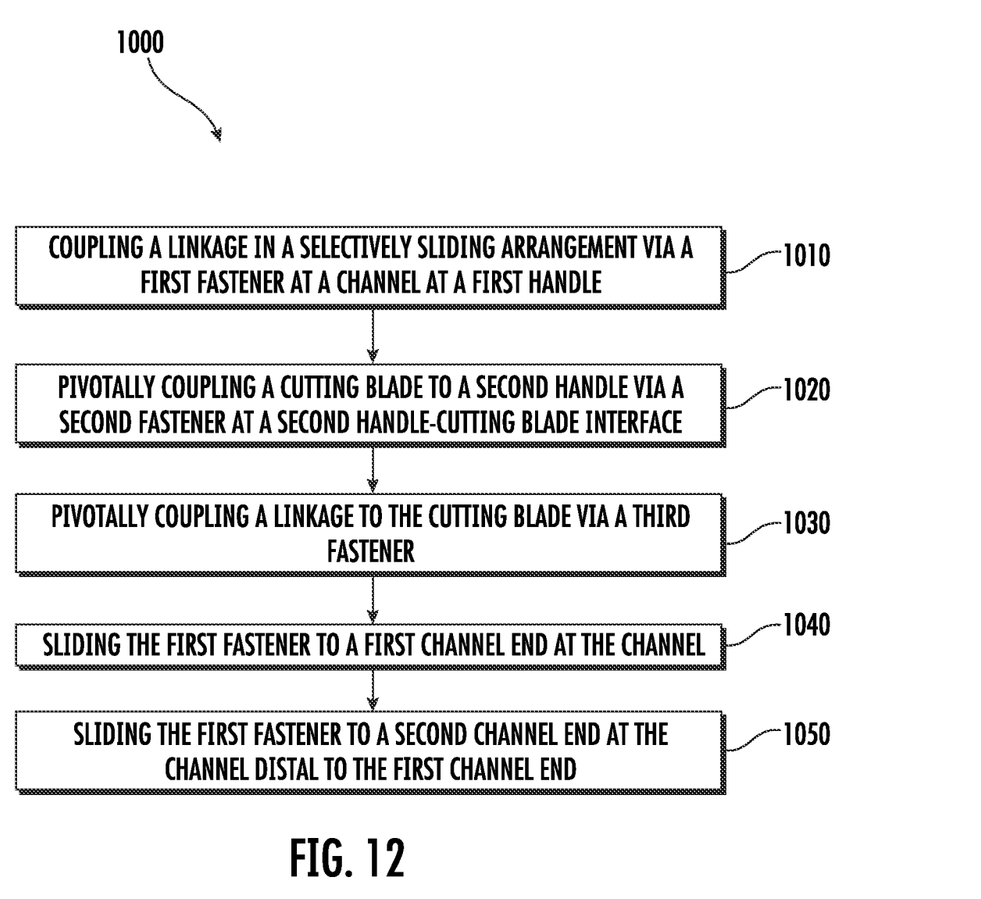
FIG. 12 provides a flowchart outlining exemplary steps of a method for dual-mode operation of a hand tool in accordance with aspects of the present disclosure.

Accordingly, an aspect of the present disclosure is directed to a method for dual-mode operation of a hand tool (hereinafter, "method 1000"), such as outlined in the flowchart of FIG. 12. Method 1000 may be performed at hand tools such as depicted and described herein, or other substantially similar embodiments such as described herein. Method 1000 includes at 1010 coupling a linkage in a selectively sliding arrangement via a first fastener at a channel at a first handle. Method 1000 at includes at 1020 pivotally coupling a cutting blade to a second handle via a second fastener at a second handle-cutting blade interface, and at 1030 pivotally coupling a linkage to the cutting blade via a third fastener. Method 1000 includes at 1040 sliding the first fastener to a first channel end at the channel, wherein sliding the first fastener to the first channel end configures the hand tool in a first operating mode. In particular embodiments, sliding the first fastener to the first channel end at the channel includes sliding the first fastener through the channel toward the cutting blade. In still particular embodiments, the first operating mode includes an extension of the first handle relative to the second handle of up to approximately 92 degrees. Method 1000 includes at 1050 sliding the first fastener to a second channel end at the channel distal to the first channel end, wherein sliding the first fastener to the second channel end configures the hand tool in a second operating mode. In particular embodiments, sliding the first fastener to the second channel end at the channel includes sliding the first fastener through the channel away from the cutting blade. In still particular embodiments, the second operating mode includes an extension of the first handle relative to the second handle of up to approximately 49 degrees.

In the first operating mode, or compound mode, fastener 123 is positioned through channel 168 at first channel end 122. Such positioning may allow for greater angular movement of first handle 110 relative to second handle 120, such as depicted and described in regard to FIGS. 1-4. In the second operating mode, or speed action mode, fastener 123 is positioned through channel 168 at second channel end 124. Such positioning may allow for relatively quick cutting or clamping action movement of first handle 110 and second handle 120, such as depicted and described in regard to FIGS. 5-9.

In various embodiments, first handle 110, second handle 120, cutting blade 130, and linkage 140 form separable components relative to one another. Fasteners 127, 143, 147 may each include pins, screws, bolts, or other mechanical fasteners appropriate for allowing pivoting movement such as described above. Fastener 123 may include any appropriate type of mechanical fastener. Fastener 123 may furthermore include any appropriate type of mechanical fastener such as may allow for quick-disconnect and re-assembly of fastener 123 into pairs of openings at linkage 140, such as described above. Fastener 123 may be configured as a pin, spring-loaded device, button, rod, or other appropriate type of mechanical fastener such as may allow for selectively sliding movement of fastener 123 to ends 122, 124 through channel 168.

Figure 8:
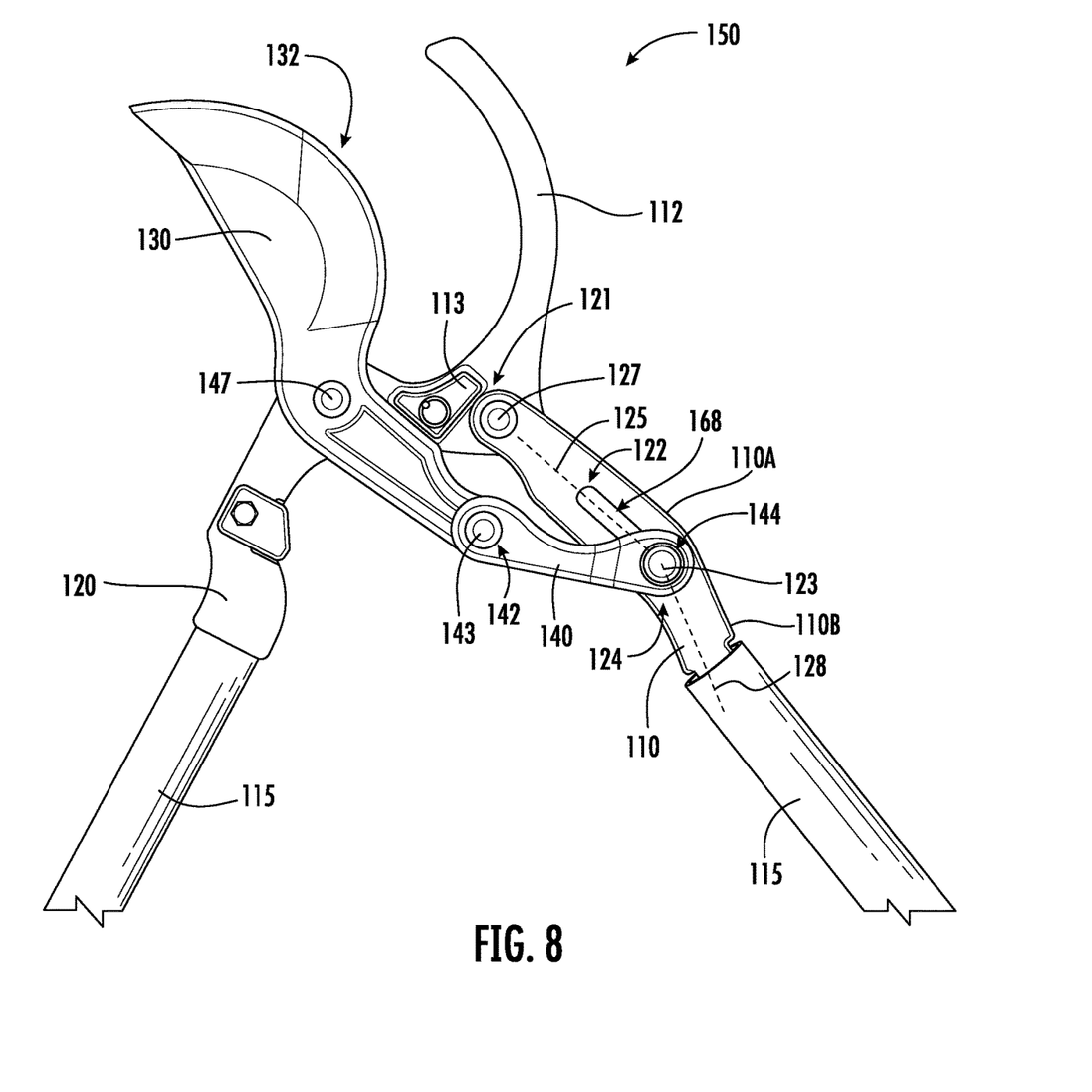
FIG. 8 depicts a detailed view of an exemplary embodiment of the first side of the hand tool in the open position in the second operating mode in accordance with aspects of the present disclosure.
Figure 9:
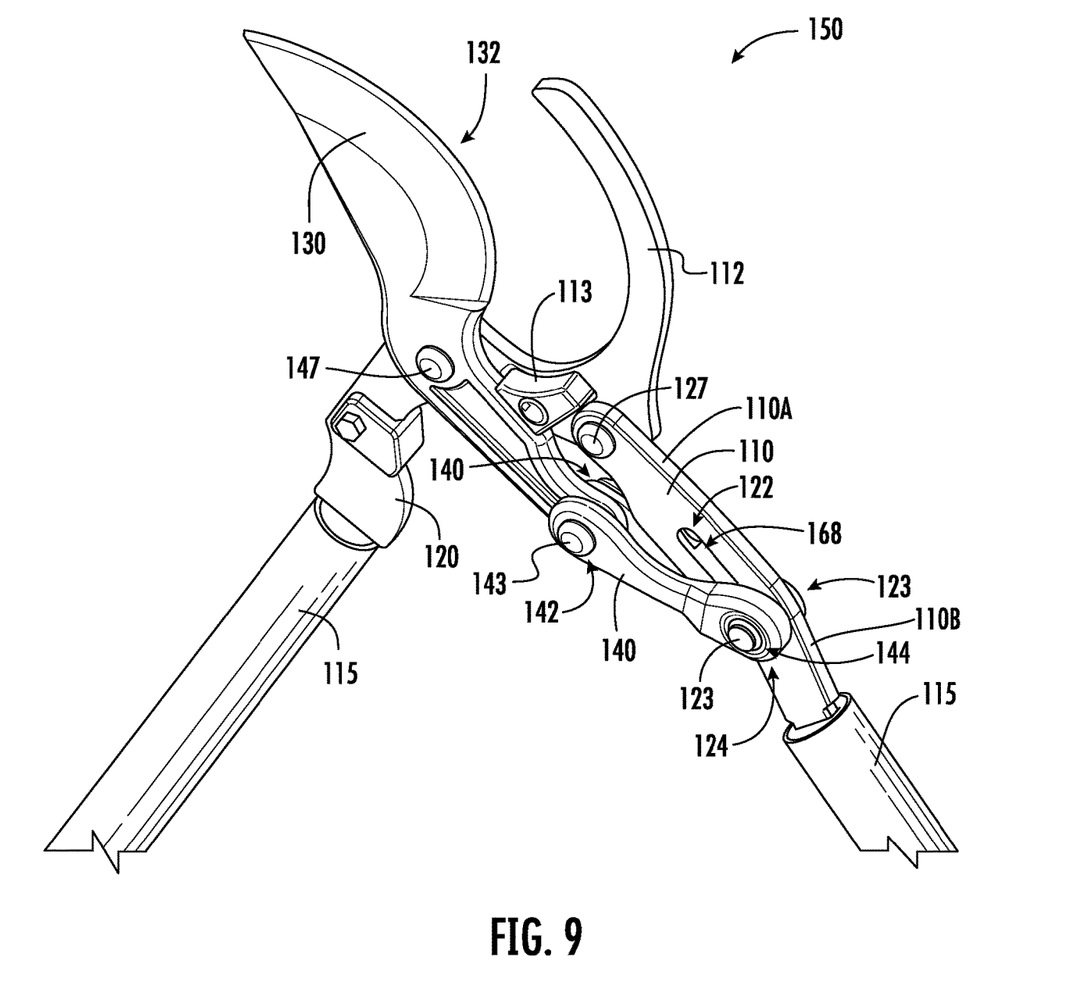
FIG. 9 depicts a detailed perspective view of an exemplary embodiment of the hand tool in the open position in the second operating mode in accordance with aspects of the present disclosure.

Referring now to FIGS. 8-9, in various embodiments, first handle 110 includes a first portion 110A and a second portion 110B. First portion 110A extends substantially along axis 125 (e.g., first axis). In a particular embodiment, reference axis 128 (e.g., second axis) extends at an acute angle relative to axis 125. In a still particular embodiment, reference axis 128 extends at an angle toward second handle 120. In various embodiments, openings at the first handle 110 and channel 168 are formed through first portion 110A. Second portion 110B may particularly form a portion of the first handle 110 at which handle grip 115 is positioned onto the first handle 110. In a particular embodiment, first portion 110A and second portion 110B allow handle grip 115 at first handle 110 to position more closely to handle grip 115 at second handle 120 when in the closed position (e.g., FIGS. 4-5). When the user articulates the handle grips 115 into the open position (e.g., FIGS. 1-3, FIGS. 6-9), the user may receive power transfer benefits related to compound action movement and speed benefits related to speed action movement while further having a reduced arc between the handle grips 115.

Figure 10:
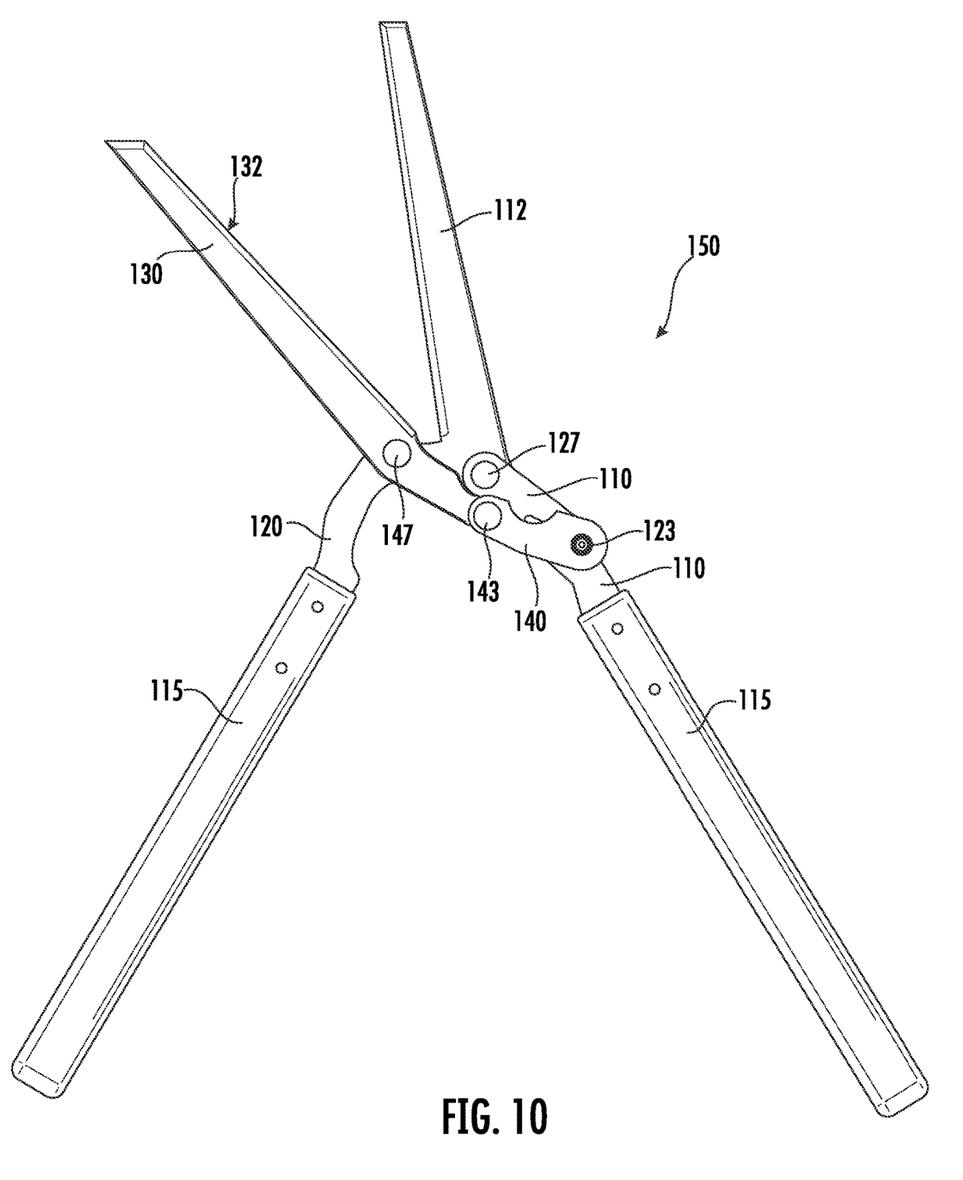
FIG. 10 depicts an exemplary embodiment of the hand tool in accordance with aspects of the present disclosure.
Figure 11:
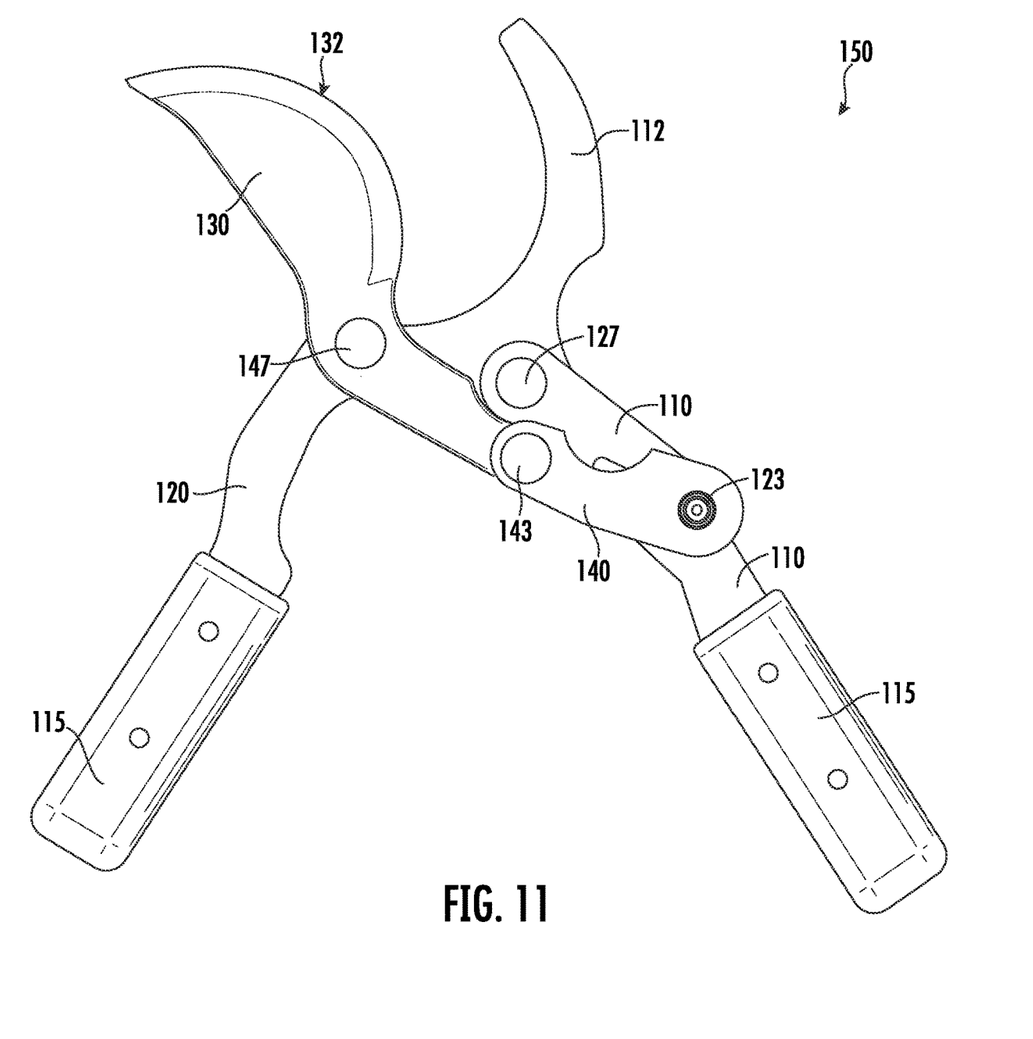
FIG. 11 depicts an exemplary embodiment of the hand tool in accordance with aspects of the present disclosure.

FIG. 10 depicts an exemplary embodiment of hand tool 150 configured as a hedge shear, pruning shear, or grass shear is provided. FIG. 11 depicts an exemplary embodiment of hand tool 150 configured as a garden shear, pruner, or small cutter is provided. Still other embodiments of hand tool 150 provided herein may be configured as pliers or other gripping tool including embodiments of the first handle 110, the second handle 120, the linkage 140, and fasteners 127, 123, 143, 147 such as provided herein. It should be appreciated that embodiments of cutting member 112 may be a first member and cutting blade 130 may be a second member, in which each of the first member and second member may be configured as grips, clamps, jaws, or other desired members configured to articulate to and from one another with compressive force, shearing force, or both. Accordingly, it should be appreciated that various embodiments of hand tool 150 provided herein may be configured as a hedge shear, a garden shear, a lopper, a pruner tool, small cutters, pliers, or other appropriate hand tool.

Embodiments of hand tool 150 provided herein may allow a user to switch between the first operating mode and second operating mode without necessitating removal or separation of a fastener from the first handle, second handle, or cutting blade. Compound action movement allows the user to open the hand tool to a wider position, such as to allow for greater force to be applied through the handles and through to the cutting member and cutting blade. Speed action movement allows the user to open the hand tool to a lesser angle relative to the compound action movement, such as to allow the user to articulate the handles, and associated cutting blade and cutting member, with greater speed. Embodiments of the hand tool provided herein may allow the user to articulate between the compound mode and speed action mode relatively quickly. Still further embodiments of the hand tool provided herein may allow such articulation between modes without necessitating additional parts, components, fasteners, and without requiring removal of fasteners, parts, or components from the hand tool.

Further aspects of the invention are provided by one or more of the following clauses:

1. A hand tool, the hand tool including a first handle forming a channel extending along an axis corresponding to an extension of the first handle; a second handle including a cutting member; and a cutting blade forming a first opening and a second opening, wherein a linkage is attached, via a first fastener, in pivotal arrangement to the first handle at the channel and to the cutting blade at the second opening, and wherein the cutting blade is attached, via a second fastener, in pivotal arrangement to the second handle at the first opening.

2. The hand tool of any one or more clauses herein, wherein the cutting blade and linkage are pivotally attached via a third fastener.

3. The hand tool of any one or more clauses herein, wherein the first handle forms at the channel a first channel end and a second channel end, wherein the first channel end is separated along the axis at the first handle from the second channel end.

4. The hand tool of any one or more clauses herein, wherein the first handle is attachable to the cutting blade in a first operating mode via the first fastener positioned through the first opening and at the first channel end.

5. The hand tool of any one or more clauses herein, wherein the first handle is attachable to the cutting blade in a second operating mode via the first fastener positioned through the first opening and at the second channel end.

6. The hand tool of any one or more clauses herein, wherein the second channel end is positioned proximate to a handle grip and distal to the cutting blade, and wherein the first channel end is positioned distal to the second channel end.

7. The hand tool of any one or more clauses herein, wherein the first fastener is configured to releasably attach at one or the other of the first channel end or the second channel end.

8. The hand tool of any one or more clauses herein, wherein the linkage forms a groove configured to receive a fourth fastener, wherein the fourth fastener pivotally attaches the second handle and the first handle.

9. The hand tool of any one or more clauses herein, wherein the linkage forms the groove configured to receive the fourth fastener when the hand tool is in an extended second position in a first operating mode.

10. The hand tool of any one or more clauses herein, wherein the cutting blade and linkage are pivotally attached via a third fastener, and wherein the groove is formed between the third fastener and the first fastener.

11. The hand tool of claim 1, wherein the first handle includes a first portion and a second portion, wherein the first portion extends substantially along the reference axis, and wherein the second portion extends from the first portion at an acute angle relative to the reference axis.

12. The hand tool of any one or more clauses herein, wherein the channel is formed at the first portion of the first handle.

13. The hand tool of any one or more clauses herein, wherein the first fastener is slidable through the channel to the first channel end position the linkage, the cutting blade, the first handle, and the second handle together in a first operating mode.

14. The hand tool of any one or more clauses herein, wherein positioning the linkage, the cutting blade, the first handle, and the second handle together in the first operating mode allows the first handle to articulate at an angle up to approximately 92 degrees relative to the second handle.

15. The hand tool of any one or more clauses herein, wherein the first fastener is slidable through the channel to the second channel end position the linkage, the cutting blade, the first handle, and the second handle together in a second operating mode.

16. The hand tool of any one or more clauses herein, wherein positioning the linkage, the cutting blade, the first handle, and the second handle together in the first operating mode allows the first handle to articulate at an angle up to approximately 49 degrees relative to the second handle.

17. The hand tool of any one or more clauses herein, wherein the hand tool is a lopper, a garden shear, a hedge shear, a pruning shear, a small cutter, pliers, or combinations thereof.

18. A method for operating a hand tool, the method including coupling a linkage in a selectively sliding arrangement via a first fastener at a channel at a first handle; pivotally coupling a cutting blade to a second handle via a second fastener at a second handle-cutting blade interface; pivotally coupling a linkage to the cutting blade via a third fastener; sliding the first fastener to a first channel end at the channel, wherein sliding the first fastener to the first channel end configures the hand tool in a first operating mode; and sliding the first fastener to a second channel end at the channel distal to the first channel end, wherein sliding the first fastener to the second channel end configures the hand tool in a second operating mode.

19. The method of any one or more clauses herein, wherein sliding the first fastener to the first channel end at the channel includes sliding the first fastener through the channel toward the cutting blade.

20. The method of any one or more clauses herein, wherein the first operating mode includes an extension of the first handle relative to the second handle of up to approximately 92 degrees, and wherein the second operating mode includes an extension of the first handle relative to the second handle of up to approximately 49 degrees.

21. The method of any one or more clauses herein for operating the hand tool of any one or more clauses herein.

22. A shear assembly, the shear assembly including the first handle of any one or more clauses herein; the second handle including the cutting member; and the cutting blade of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hand tool, the hand tool comprising:
    a first handle forming a channel;
    a second handle comprising a cutting member; and
    a cutting blade forming a first opening and a second opening, wherein a linkage is attached, via a first fastener, in pivotal arrangement to the first handle at the channel and to the cutting blade at the second opening, and wherein the cutting blade is attached, via a second fastener, in pivotal arrangement to the second handle at the first opening, wherein the cutting blade and the linkage are pivotally attached via a third fastener, and wherein the first handle is pivotally attached to the second handle via a fourth fastener,
    wherein the first handle forms at the channel a first channel end distal to a second channel end, wherein the first channel end is separated along a first reference axis at the first handle from the second channel end, the first reference axis corresponding to an extension between the fourth fastener and the first fastener at the second channel end, wherein the first handle is attachable to the cutting blade in a first operating mode via the first fastener positioned at the first channel end, and wherein the first handle is attachable to the cutting blade in a second operating mode via the first fastener positioned at the second channel end,
    wherein the first handle comprises a first portion and a second portion, wherein a handle grip is positioned onto the first handle at the second portion, wherein the first portion extends substantially along the first reference axis, and wherein the second portion extends substantially along a second reference axis corresponding to an extension between the first fastener at the second channel end and the handle grip, and wherein the first reference axis and the second reference axis extend at an acute angle relative to one another, and wherein the channel extends straight along the first reference axis at the first portion.

2. The hand tool of claim 1, wherein the second channel end is positioned proximate to the handle grip and distal to the cutting blade, and wherein the first channel end is positioned distal to the second channel end.

3. The hand tool of claim 1, wherein the first fastener is configured to releasably attach at one or the other of the first channel end or the second channel end.

4. The hand tool of claim 1, wherein the linkage forms a groove configured to receive the fourth fastener.

5. The hand tool of claim 4, wherein the linkage forms the groove configured to receive the fourth fastener when the hand tool is in an extended second position.

6. The hand tool of claim 4, wherein the groove is formed between the third fastener and the first fastener.

7. The hand tool of claim 1, wherein the first fastener is slidable through the channel to the first channel end to position the linkage, the cutting blade, the first handle, and the second handle together in a first operating mode.

8. The hand tool of claim 7, wherein positioning the linkage, the cutting blade, the first handle, and the second handle together in the first operating mode allows the first handle to articulate at an angle up to approximately 92 degrees relative to the second handle.

9. The hand tool of claim 7, wherein the first fastener is slidable through the channel to the second channel end to position the linkage, the cutting blade, the first handle, and the second handle together in a second operating mode.

10. The hand tool of claim 9, wherein positioning the linkage, the cutting blade, the first handle, and the second handle together in the first operating mode allows the first handle to articulate at an angle up to approximately 49 degrees relative to the second handle.

11. The hand tool of claim 1, wherein the hand tool is a lopper, a garden shear, a hedge shear, a pruning shear, a single hand-held cutter, pliers, or combinations thereof.

12. The hand tool of claim 1, wherein the handle grip extends from the second portion along an axis different from the first reference axis and the second reference axis.

13. A method for operating a hand tool, the method comprising:
    coupling a linkage in a selectively sliding arrangement via a first fastener at a channel at a first handle;
    pivotally coupling a cutting blade to a second handle via a second fastener at a second handle-cutting blade interface;
    pivotally coupling the linkage to the cutting blade via a third fastener;
    pivotally coupling the first handle to the second handle via a fourth fastener;
    sliding the first fastener to a first channel end at the channel, wherein sliding the first fastener to the first channel end configures the hand tool in a first operating mode, and wherein the channel extends straight along a first reference axis corresponding to an extension between the fourth fastener and the first fastener at a second channel end distal to the first channel end;
    sliding the first fastener to the second channel end at the channel distal to the first channel end, wherein sliding the first fastener to the second channel end configures the hand tool in a second operating mode; and extending a first portion of the first handle substantially along the first reference axis; and extending a second portion of the first handle substantially along a second reference axis from the first fastener at the second channel end toward a handle grip at an acute angle relative to the first reference axis.

14. The method of claim 13, wherein sliding the first fastener to the first channel end of the channel comprises sliding the first fastener through the channel toward the cutting blade.

15. The method of claim 13, wherein the first operating mode comprises an extension of the first handle relative to the second handle of up to approximately 92 degrees, and wherein the second operating mode comprises an extension of the first handle relative to the second handle of up to approximately 49 degrees.

16. The method of claim 13, comprising:
extending the handle grip from the second portion along an axis different from the first reference axis and the second reference axis.

* * * * *